United States Patent [19]

Guardiola

[11] 4,405,023

[45] Sep. 20, 1983

[54] APPARATUS FOR HANDLING AND WEIGHING FRUITS AND THE LIKE

[76] Inventor: Agustin D. Guardiola, Camelia 36, Barcelona, Spain

[21] Appl. No.: 350,834

[22] Filed: Feb. 22, 1982

[30] Foreign Application Priority Data

Mar. 6, 1981 [ES] Spain .................................... 500.951

[51] Int. Cl.[3] ............................................ G01G 19/22

[52] U.S. Cl. ...................................... 177/59; 177/103; 177/145; 198/504; 209/592

[58] Field of Search ................... 177/25, 59, 103, 114, 177/116, 145, 50; 198/505, 504, 360; 209/592

[56] References Cited

U.S. PATENT DOCUMENTS

| | | | |
|---|---|---|---|
| 3,708,025 | 1/1973 | Soler | 177/1 |
| 4,206,822 | 1/1980 | Mazzucchelli | 177/25 |

*Primary Examiner*—Joseph W. Hartary

*Attorney, Agent, or Firm*—Flynn, Thiel, Boutell & Tanis

[57] ABSTRACT

A handling and weighing machine for fruits and the like, characterized by a feed entry having various channels terminating in structure for retaining the product to be weighed and allowing it to rest there, followed by a horizontal transport device for carrying the product from the retention structure to a weighing device and, following this, from the weighing device to a vertical transport which carries the product to a number of ramps which are superposed at differing heights, which ramps discharge into respective storage areas.

11 Claims, 2 Drawing Figures

APPARATUS FOR HANDLING AND WEIGHING FRUITS AND THE LIKE

FIELD OF THE INVENTION

The present invention relates to improvements in automatic weighing machines for fruit and the like, which provides appreciable advantages both as regards the reliability and exactitude of the weighing operation when compared to present technique, as well as providing benefits to the user of the machines.

BACKGROUND OF THE INVENTION

Up until now, the weighing of fruits prior to their subsequent packaging was carried out, in the majority of cases, using balances of various degrees of accuracy and which were hand operated, which means that the corresponding personnel are kept fully occupied, the rate of throughput of the product is relatively slow and errors result in the final weight of each packaged unit of fruit. Along with this, although on a greatly reduced scale, fruits are also weighed using a process which can be referred to as being semi-automatic, in which, first of all, a pre-weighing operation or partial filling of the scale pan of the corresponding balance is carried out after which the weight is finally adjusted manually, the operator then starting to fill the scale pan until a weight is finally achieved which is the closest to the desired weight, this process suffering fundamentally from the same disadvantages as those stated above in connection with weighing done on a completely manual basis.

An automatic weighing machine for fruits is also known although it is only used on a very limited scale at present, and this carried out automatic pre-weighing using a relatively large quantity of the product to be weighed and then carries out fine adjustment of the weight in order to bring this to the desired value, this being done by rejecting or accepting the fruit which remains, but this process is very slow and leads to high costs as a result of the poor weighing performance of this machine, apart from the irregularities which occur in the desired final weight.

Finally, an automatic weighing machine is known, although it is practically unknown on the market, which in the same fashion as that discussed above, carries out pre-weighing on a large portion of the products to be weighed, to which one or several units which have been individually weighed in advance are added, and this again suffers from the disadvantages referred to above, particularly concerning the relatively low degree of accuracy of the final weight of the batch of fruit.

The improvements in automatic weighing machines for fruit and the like, constituting the object of the present invention, are characterised in that they consist of: a feed entry having various channels terminating in means for retaining the product to be weighed, and allowing it to rest there, followed by horizontal transport means arranged in sets in which each set corresponds to one of said channels, the said sets being out of phase with each other as regards their motion and carrying the corresponding product from the respective retention means to a weighing means assigned to each set and, following this, from said weighing means to vertical transport means which are also constituted by the same number of sets and channels and which carry the product, which has already been weighed, to a number of ramps which are superimposed at differing heights, which discharge into respective storage areas provided with means for discharging their content, a further ramp, located above those referred to previously, being provided for leading the rejected products (as a result of its having an inadequate weight) towards the entry into the machine, the vertical transport means having selector means which allow the product to be discharged on to the corresponding ramp, and horizontal and transverse transport means being provided below said storage areas for carrying away the product in batches of predetermined and adjustable weight. The machine also includes a processing unit and programmer which establishes the strategy to be followed starting from the desired final weight of each batch of units of the product to be weighed and taking into account the actual weight of the unit to be obtained from the machine, means linking the processing unit to the various components of the machine in order to coordinate and control the latter, particularly with regard to the selective discharge of each group of the products which have already been weighed in a particular storage area, or in the reject area, employing the selector means provided on the vertical transport means and making use of the corresponding ramp; and means for operating the various components of the machine, as well as a supporting structure for these.

The means for retaining the product can be arranged at the inside end of the channel providing the feed entry to the machine and can be made up by an arrangement of "V" shaped parallel rods which fill the width of each channel and constitute sets, present in the same number as said channels, which are limited laterally by corresponding vertical flanges in order to prevent the product, which has temporarily been retained from being discharged laterally.

Advantageously, the horizontal transport means are made up by a series of inverted "U" shaped plates which are arranged vertically and parallel to each other and constitute sets which face the feed channels and are arranged so as to match up with these, both as regards location and width, so that the plates can be situated in the free spaces existing between the retention means, the plates being linked in a swivelling fashion at their lower ends to the corresponding arms of two parallel cranks which move in synchronism to each other, and the plates having at their upper region a series of V-shaped concavities for providing consecutive support of the products to be transported from the retention means to the vertical transport means, the two end plates of each group being smooth to prevent the product being transported from falling from the side of these means.

Advantageously, the weighing means consists of a series of vertical plates which are parallel to each other, which constitute sets facing the corresponding feed channels and are located on top of transducers of the load cell type; the said plates having V-shaped concavities at their upper region with the exception of the end plates of each group, which are smooth in order to prevent lateral overflow of the product being weighed, the arrangement being such that the free spaces between each pair of said plates is in alignment with the corresponding plate of the horizontal transport means, in order to allow intercalation and mutual passage of these during the motion of the horizontal transport means; the plates of the weighing means may be provided with shock absorbing components at their upper edges, for damping down the possible vibrations of the products to be weighed to thus facilitate the weighing operation.

It is possible to provide, between the weighing means and the vertical transport means, fixed means for allowing temporary resting of the product which is being transported, these being made up by a series of vertical plates which are parallel and arranged in sets which are aligned with the corresponding feed channel, the above said plates being provided with V-shaped concavities at their upper region, with the exception of the two end plates of each set which are smooth in order to prevent the product being supported from overflowing in the transverse sense, the arrangement being such that the plates of the horizontal transport means are able to pass between each pair of the above-said plates to allow the movement of said transport means.

Advantageously, the vertical transport means are made up by two lateral endless chains mounted on corresponding guiding, driving and operating components, between which a certain number of transverse and tiltable tubular supports are provided, these having rods joined to them which lie in planes which are perpendicular to the said supports and which constitute V-shaped grids arranged in a number of sets corresponding to the number of channels and in alignment with the latter, each group, at its ends having rods which are bent towards the inside of the V in order to prevent the product being transported from falling off at the edge, this being done in such a way that the free spaces between each pair of rods is able to fit between the corresponding plates of the horizontal transport means, so that the product which has already been weighed can be deposited on the corresponding grid; and the forward portion of the vertical transport means is operated in the ascending sense, so that the product is raised to reach a position at which, following operation of pivoted parts on the guide path on which corresponding wheels of arms joined to the end of the transverse tubular support, slide a backwards deflection of the corresponding pair of arms is produced and, as a result of this, a rotation of its support is obtained thus bringing about a downwardly directed turning movement of the grid or grids, thus causing the product to fall onto the corresponding ramp, which then leads the product to the respective storage area; if the product is qualified as having been rejected, by the processing unit, it will not be discharged on to the ramps linked to the operative storage areas and will be raised to a position above these where it will be discharged on to the reject ramps, so that it will be unloaded and directed towards the entry to the machine, since, at this final upper end of the ascending path, fixed deflecting means are provided which cause all the grids to automatically be tilted downwardly after which the chains, together with the transverse supports and empty grids will continue by descending vertically, at the rear of the machine, in order to return to the starting position, where without interruption and continuously, they recommence their active ascending travel.

Preferably, the storage areas are made up in such a way that each pair of them is bordered by a common intermediate wall which is fixed and by two symmetrical movable parts, each one of which constitutes the other transverse wall and the base respectively, each storage area being closed by means of two lateral walls which are displaceable outwardly to facilitate discharge of the product having the desired final weight; this discharge operation being brough about by rotation of the movable part of the storage area, which at this precise time contains the product having the desired weight, this being brought about by the processing unit via suitable operating means, the product falling on to an endless belt of adequate width which is mounted on suitable rollers and includes operating means.

The improvement constituting the object of the present invention gives rise amongst other things, to the following advantages, the possibility of setting up the machine to obtain batches of fruit of pre-determined weight, within established limits, where products are involved which are difficult to weigh due to the presence of variations in weight between each unit and where it is not possible to divide the product (oranges, lemons, apples, etc.); the attaining of exact weights of each batch, within the pre-established tolerances starting, as has been indicated above, from products of irregular weights, the weighing and final supply of batches of fruit having pre-established weights and tolerances in a completely automatic manner and at a high rate of throughput which is much greater than that of machines and apparatuses known up until now, in other words at a high operating speed of the machine and, as a result of this, a high rate of output from the machine, a reduced reject rate of units of the product being handled, when compared to the reject rate of known machines and apparatuses, since here, the combination of units of the porduct is used in order to obtain the desired final weight; additionally, it provides the possibility of regulating the final weight of each batch of units of the product prior to its subject packaging, as well as the possibility of regulating the tolerance limit of this final weight in a manner which is both easy and direct and is carried out by the actual user of the machine; additionally, the machine is simple and easily adaptable to use with conventional packaging lines (it only being necessary to provide a feed machine in front of the weighing machine and a packaging machine following the weighing machine) this being simple as the height of the entry to the machine can easily be adapted to the actual height of the feed machines present on existing production lines and, since the fruit is raised using the vertical transport means it is possible, at the same time, to feed conventional packaging machines with a resulting saving in space; additionally, the possible risk of damaging the fruits which are normally products which are fragile and delicate and easily deteriorate, is eliminated as a result of the use of the retention means, horizontal transport means and vertical transport means in the form in which they are provided on the machine, since the construction and specific arrangement, both in the absolute and relative sense, of the horizontal transport means and the weighing means prevent blows and vibrations being imparted to the product which is being weighed, leading to good weighing performance both as regards the accuracy and speed, this being greater than that present in known machines and apparatuses; furthermore, the specific fixed means for allowing temporary standing of the product which is being transported makes it possible to reduce the volume of the machine as it is not necessary to make use of cranks having relatively large dimensions which would be necessary to provide horizontal displacements needed in machines of this size; and lastly the actual constructions and arrangements of the storage areas provided in the machine avoid, firstly, the products from being knocked against each other and, secondly, allow a greater speed of discharge, which results in an increased throughput or speed of operation, which is backed up using an endless belt arranged below the said storage areas, this all leading to a greater rate of output than that obtained in the case of known machines and apparatuses.

Finally, variation can be made in the number of the following facilities: the entry feed channel, the ramps and corresponding collection means for discharging the product on to them, the storage areas for receiving and temporarily storing the product (until corresponding batches of pre-determined weights are obtained), the horizontal and transverse transport means situated below the storage areas (for discharging the above stated batches of pre-weighed products) and, finally, the means for operating the components of the machine. The number of sets of the following, and the components of each set can be varied; the retaining means for the product to be weighed, the horizontal transport means, the weighing means, the fixed means for temporarily storing the product (these may, or may not be present depending on the requirements) and the vertical transport means.

DETAILED DESCRIPTION

Figure 1:
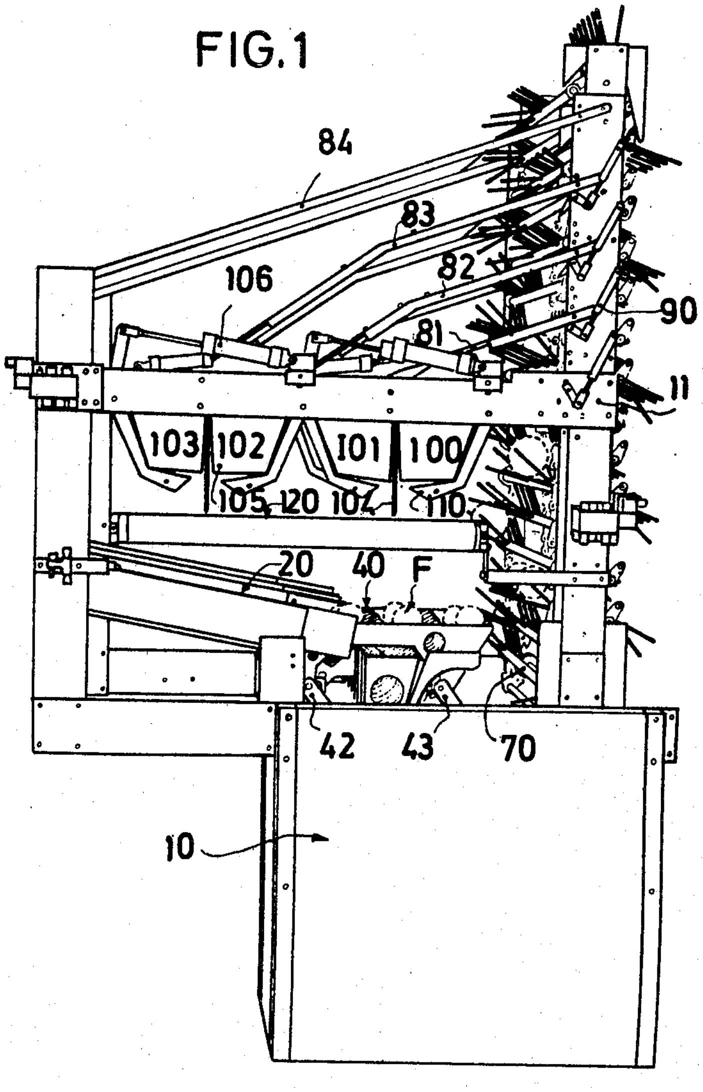
FIG. 1 is a perspective view of the machine according to the present invention.

With reference now to the drawings, FIG. 1 shows a practical embodiment of the automatic weighing machine for fruit and the like, provided with the improvements constituting the object of the present invention, and this consists of: a supporting structure 10 for the various components of the machine, a feed entry having several side-by-side upward opening guide channels 20 which guide the fruit to be weighed, F, for example from a feed machine (which is not shown) in an ordered fashion, which channels terminate in means 30 where the fruit $F_1$ is retained and allowed to rest (See FIG. 2), following this horizontal transport means 40 are provided arranged in a number of side-by-side sets identical to the number of channels 20 with which they are in alignment, the said sets being moved out of phase with respect to each other, and these sets being provided for carrying the fruit $F_1$ to an equivalent number of weighing means 50, thus bringing the fruit to a position $F_2$, (see FIG. 2) and, following this, for carrying the fruit to fixed support means 60 where the fruit $F_3$ is temporarily stored (these fixed means can be provided in a varying number and may even, depending on the requirements, not be present), and from these latter fixed support means 60 the fruits are carried by the transport means 40 to the vertical transport means 70 (See FIG. 2), which also are made up by the same number of sets as there are channels and are in alignment with the latter as regards their vertical plane, these vertical transport means 70 raising the fruits $F_4$ (see FIG. 2) which have already been weighed in the sense indicated by the direction of the fruit from $F_4$ to $F_5$ (see FIG. 2) until they reach the elevation of ramps (such as 81, 82, 83) which are positioned one above another and at varying heights, the lowermost ramp 80 not being shown as it is hidden by a horizontal sheet metal frame plate 11, these ramps 80, 81, 82, 83 discharging into respective storage areas 100, 101, 102 and 103, which storage areas are provided with means 110 for discharging their contents, a further ramp 84 being provided above the other ones for carrying the rejected (as a result of not possessing an adequate weight) fruit towards the entry to the machine. The vertical transport means 70 have selector means which, as a result of their operations by a corresponding pneumatic cylinder 90 or other suitable operating means, allows the fruit to be discharged on to the corresponding ramp, it then being lead to the respective storage area, so that on each occasion when a storage area has been loaded with the quantity of fruit or combination of fruits having the desired final weight, this being previously set up on the machine, the fruit can be discharged from the said storage area by employing the respective means 110, so that the said batch of fruit falls and is deposited on to horizontal and transverse transport means 120, which are provided just below the storage areas for permitting the fruit to be temporarily stored, so that the said batches of fruit can be transported for discharge from the machine, where, normally they are carried to the next machine on the packaging line, this being the actual packaging machine, so that they can be packaged into corresponding nets or the like so as to constitute packets or units of fruit of predetermined weight, this being adjustable by the machine operator.

In order to carry out the various stages of the operation and in order that they may take place in the appropriate sequence, a processor unit and programmer is provided which establishes the strategy to be followed in each case in order to obtain units of the product having a pre-established weight, the tolerance limits of which will also be established by the machine operator. This strategy is adopted depending on the desired final weight of each batch of units of the product to be weighed, in this case fruits, and will take into account the actual weights of the units obtained, at the machine using the weighing means 50 and for this purpose the processor unit will continuously display the maximum and minimum weights of each subset of units for example, in this case two oranges, and will carry out computation of the differences with respect to the pre-established maximum and minimum weight, at the tolerance limits desired, of the total desired weight of the product. Following this, computation is carried out of the level of acceptance of the product in order to allow it to pass to the next level, this being carried on until the total weight, as set up by the operator is obtained. It should be noted that a minimum tolerance for the weight difference could be set up and this could even be zero—in the case where exact weighing is being carried out—but this would lead to the production of a large number of rejects, in other words, units of the products which did not match up to the programmed values, and the time necessary to obtain batches of fruits having the final desired weight would be excessive, bringing about a reduction in the output from the machine.

In order to facilitate the strategy to be followed by the processor unit, it is most suitable when a relatively small number of side-by-side feed channels 20 is provided, the width of one of these being greater than that of the others in order to allow the passage through this one channel of several units of the product to be weighed, since the width of the remaining channels must only allow the passage of one single unit of the product to be weighed, although it will be clear that the number and width of the channels 20 will fundamentally depend on the processing unit and programmer and on the cost/output function of the machine.

The out-of-phase movement of the sets of horizontal transport means 40 will be adapted to the actual requirements of the processing unit concerned, and this is done in order to facilitate the successive weighing operation for each group, although it will be clear that said weighing operation could be carried out simultaneously using a suitable processing unit. The number of sets of the horizontal transport means 40, and their width and those of the vertical transport means 70, is a function of the number and width of the channels 20.

Corresponding linkages are provided between the processing unit and programmer and the various components of the machine, in order to provide for control and coordination of the latter, particularly as regards the selective discharge of each group of fruit, $F_5$, already weighed and in a determined storage area, using the ramps 80, 81, 82, and 83, or at the reject area, this being done using the selector means, which for this purpose, are provided on the vertical transport means 70, so that the rejected fruits are carried, via the ramp 84, to the entry to the machine so that they may participate in a fresh cycle; the said means for selecting discharge on to the reject ramp 84 will operate automatically in every case, so that only fruit which has not already been discharged onto one of the ramps immediately below it, will be discharged there.

The normal and conventional means for operating the various components of the machine (which are not shown) are obviously present, and these may consist of one or several electric motors, suitably provided with speed reduction gears where it is desired to obtain velocities lower than normal, speed regulators also advantageously being provided in order to start up the machine at a relatively low speed and then increase the speed in accordance with the need and the type of product which is being handled.

The linkages between the various movable components of the machine have proved to most suitably take the form of a pneumatic system using compressed air, and these are operated by means of electro-magnetic valves which in their turn are regulated by the processing unit, in accordance with the program and strategy established. Nevertheless, the use of other means for providing this linkage should not be ruled out, and these means could consist of hydraulic means, or other means.

Finally, it has been found that the machine is able to function correctly using a processing unit and programmer of fairly low cost and one channel 20 of a width equivalent to three fruits, in other words three oranges, and two single channels 20, in other words channels which allow the passage of the oranges one behind the other in a single line, so that the strategy for filling the storage areas is facilitated, the maximum quantity of fruit being established initially and this being followed by the addition of fruit unit by unit until the final weight is achieved, this having been predetermined and set up by the machine operator, for each batch of units of the product present in the corresponding storage area.

Figure 2:
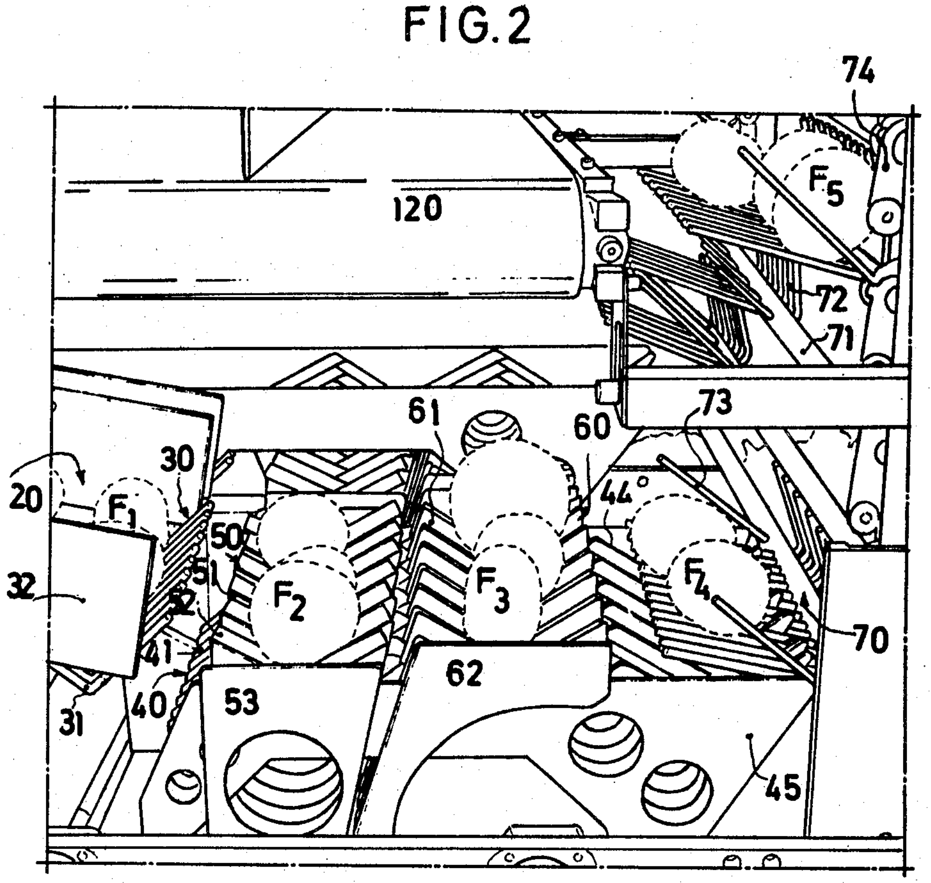
FIG. 2 is a fragmentary perspective view, on an enlarged scale, of a portion of the inventive machine.

In FIG. 2, the retention means 30 for the fruit $F_1$ have been shown, and these are located at the inner end of each channel 20, the said retention means for each channel being made up by a plurality of spaced but parallel rods 31, folded into a V-shape, these aligned rods filling the width of each channel. Each channel 20 is limited laterally by means of corresponding vertical side plates 32 for preventing the fruit which has been temporarily retained, from falling out at the side.

The horizontal transport means 40 is made up by a series of plates 41 in the form of an inverted U-shape, these being vertical and parallel and constituting sets which are aligned with the feed channels 20 and which are provided, as has been said above, in an arrangement, both as regards their location and their width, such that the plate 41 can move through the free space present between the adjacent rods 31 of the retention means. The plates 41 are joined in a pivoted fashion at their lower ends to the corresponding arms of two parallel rotatable cranks (in FIG. 1, these will be seen at 42 and 43) so that their movements are synchronised, the number of arms of each crank corresponding to the number of channels 20, their operation being provided by a suitable drive applied to one of the two cranks, whilst the other is freely mounted or moves in cooperation with the first. The movement determined by the two cranks, which are parallel to the plates of the horizontal transport means 40, is rotational so that the fruit is picked up at a lower position, after which it is raised and then deposited on the next means, as will be described in detail below, with the maximum degree of gentleness and with the avoidance of sharp blows and vibrations imparted to the fruit. The plates 41 have at their upper portion a sequential series of V-shaped concavities 44 for providing consecutive support surfaces for the fruit as it is sequentially transported from the retention means 30 to the vertical transport means 70. The two end plates 45 of each group of plates 40 are smooth to prevent the fruit being carried by the corresponding group of plates 41 from falling over the side edges.

The weighing means 50 are made up by a series of plates 51 which are vertical and parallel to each other, and these form sets which face the corresponding feed channels and are mounted on transducers of the load cell type, for weighing the fruits, the said plates 51 having V-shaped concavities at their upper region, with the exception of the two end plates 53 of each set, which are smooth in order to prevent the fruit $F_2$ deposited here for weighing, from falling out at the side. The plates 51 are located in such a way that the free spaces therebetween are aligned with the corresponding plates 41 of the horizontal transport means 40 to allow the latter to pass in to these free spaces. In the case of the example under discussion, the plates 51 of the weighing means are provided with rubber components 52 at their upper edges for damping any possible vibrations of the fruit being weighed and these facilitate the weighing operation and its accuracy. The weighing operations are coordinated and controlled by the processing unit and programmer.

Between the weighing means 50 and the vertical transport means 70 is a fixed storage means 60 for temporary storage of the fruit $F_3$, the latter being transported in the horizontal steplike manneer. The said fixed means 60 is made up by a series of vertical plates 61, which are parallel and arranged in sets aligned with the corresponding feed channels. The plates 61 are spaced apart and are provided with V-shaped concavities at their upper region with the exception of the two end plates 62 of each set which are smooth to prevent the fruit $F_3$ from falling out at the ends. The plates 41 of the horizontal transport means 40 are able to pass between the plates 61 in order to allow them to perform their rotary movement. A series of fixed means 60 may be provided if desired, as a function of the displacement of the actual movement of the horizontal transport means 40, along the path of the horizontal transport means 40, it also being possible, if desired, to dispense with the fixed means 60.

The horizontal transport means 40 supply the already weighed fruit to the vertical transport means 70, which are made up by two lateral endless chains and are mounted on corresponding components for guiding them, driving them, and operating them. Tubular supports 71, arranged transversely, are provided between the chains and these are able to pivot and are provided with bars 72 joined to the supports. The bars 72 lie in planes which are perpendicular to those of the above mentioned tubular support 71. The bars 72 form grids having a V-shape and are arranged so as to provide the same number of sets as there are channels 20 with which they are in alignment. Each group of V-shaped bars 72 has bars 73 at its two ends which are inclined towards the inside of the V to prevent the transported fruit $F_4$ and $F_5$ from falling out at the side. The said bars 72 and 73 are arranged in such a way that the free spaces between adjacent bars can accommodate the corresponding plates 41 of the horizontal transport means 40 in order to deposit the already weighed fruit on the lifting grid 70. In the machine described here, the forward portion, in other words that located closest to the feed end of the machine, of the vertical transport means 70 is operated in the ascending sense so that the fruit $F_4$ is gradually raised to position $F_5$ etc., until it arrives at a point where, following operation by means of the pneumatic cylinders of the selector means 90 (which in their turn are operated and controlled, via the corresponding devices by the processing unit and programmer), and using pivoted parts of the guide track over which the corresponding wheels of arms 74 joined to the ends of the tubular transverse supports 71, slide, a rearward tilting of the corresponding pair of arms is produced. As a consequence of this, a rotation of its support 71 occurs, bringing about a downward tipping of its grid or grids 72, causing the fruit to slide on to the corresponding ramp (80, 81, 82 or 83), and the latter guides the fruit to the respective storage area (100, 101, 102 or 103). If the fruit is assigned by the processing unit to be a reject, it will not be discharged on to the ramps associated with the operational storage areas but will rather be carried to a position above said ramps where it is discharged on to the reject ramp 84, which ramp in turn discharges at the entry end of the machine; this being achieved by the provision at the upper end of the ascending path of fixed deflecting means which cause automatic downward tipping of all the grids 72 so that the fruit which has not already been discharged on to the lower ramps 80–83 will be discharged on to the reject ramp 84. The vertical transport means 70 now continue their vertical path but in a descending sense at the rear portion of the machine, so that the grids travel down in the empty condition and the chains together with their transverse supports 71 and grids arrive at the lower end of the vertical descending path in order to once again, without interruption and continuously, recommence their active ascending travel. Clearly, the number of ramps is not fixed and will depend on the desired number of storage areas. The change of direction of the fruit F from the horizontal to the vertical will not cause any damage to the fruit and involves no reduction in the high output of the machine when it is running at relatively high operating speeds.

The storage areas 100, 101, 102, and 103 are made up, in this case, in such a way that adjacent pairs of areas are bordered by a fixed transverse wall 104, which is intermediate and common to the two adjacent storage areas, and by two symmetrical movable parts 110, each one of which provides the other transverse wall (with respect to the machine) and the base, of its respective storage area. Each storage area is closed off by means of two sidewalls 105 which are displaceable outwardly from the storage area, for example as a result of their being pivoted at their upper ends, in this case the walls would be in metal or rigid plastics material or as a result of their being made up by a flexible material (rubber or the like, for example), these arrangements having the purpose of facilitating the discharge of a batch of fruit of a final desired weight. The above said discharge operation is brought about by rotation of the movable part 110 of the storage area, which at this time contains the batch of fruit having the pre-determined and pre-set weight, this being brought about by the processing unit using suitable actuating means, such as the fluid pressure cylinders 106. The said processing unit prevents other storage areas from discharging their contents until the one which previously started to discharge is once again closed. The opening of the box-like compartments constituting the storage areas, which occurs over the whole length of the compartments, prevents the fruit from being bumped together and this ensures that discharge is carried out more rapidly, the lateral displacement of the side walls of the storage areas cooperating in this so that the net effect is a higher speed of operation of the machine. Clearly, the actuating means 106 for obtaining rotation of the movable parts of the storage areas can be of the pneumatic or hydraulic type or can even be substituted by alternative electrical and/or mechanical means or the like, in order to provide operation of the movable part 110 of the corresponding storage area during unloading of the same.

The batch of fruit which has been discharged from the corresponding storage area falls and is collected on an endless belt having an adequate width which is mounted on suitable rollers and is provided with operating means having an adjustable speed and sense of direction, this endless belt transporting the fruit to the packaging machine which follows the weighing machine. The height and if necessary the inclination and length of the endless belt 120 should be designed to meet the actual requirements of the installation and, in particular, the feed system provided on the packaging machine which follows, on the packaging line, the automatic weighing machine described above.

In the drawings, the electrical and pneumatic conduits have not been shown, these having the task of linking the various operating devices with the source of compressed air, in this particular embodiment using corresponding solenoid valves and other accessories for their control and actual operation by the processing unit and programmer, which have also not been shown.

It should be stated that the automatic weighing machine for fruits and the like constituting the object of this present patent of invention could have introduced in to it all variations in detail which experience and practice might make advisable concerning shapes and dimensions, both absolute and relative, the number of component parts, materials employed for these parts and other circumstances of an accessory nature, and it will be additionally possible to introduce any modifications in constructional details which are compatible with the scope of the invention, as claimed.

Having described the object of the present invention, the novelty thereof is defined by the following claims.

I claim:

1. Improvements in automatic weighing machines for fruits and the like, comprising a feed entry having various channels terminating in means for retaining the product to be weighed and allowing it to rest there, followed by horizontal transport means arranged in sets in which each set corresponds to one of said channels, the said sets being out of phase with each other as regards their motion and carrying the corresponding product from the respective retention means to a weighing means assigned to each set and, following this, from said weighing means to vertical transport means which are also constituted by the same number of sets and channels and which carry the product which has already been weighed, to a number of ramps which are super-posed at differing heights, which discharge into respective storage areas provided with means for discharging their content, a further ramp located above those referred to previously, being provided for leading the rejected product (as a result of it having an inadequate weight) towards the entry into the machine, the vertical transport means having selector means which allow the product to be discharged on to the corresponding ramp, horizontal and transverse transport means being provided below said storage areas for carrying away the product in batches of predetermined and adjustable weight.

2. Improvements in automatic weighing machines for fruits and the like, in accordance with claim 1, characterised in that the means for retaining the product are arranged at the inside end of the channels providing the feed entry to the machine and can be made up by an arrangement of V-shaped parallel rods which fill the width of each channel and constitute sets, present in the same number as said channels, which are limited laterally by corresponding vertical flanges in order to prevent the product, which has temporarily been retained, from being discharged laterally.

3. Improvements in automatic weighing machines for fruits and the like in accordance with claim 1, characterised in that the horizontal transport means are made up by a series of inverted U-shaped plates which are arranged vertically and parallel to each other and constitute sets which face the feed channels and are arranged so as to match up with these, both as regards location and width, so that the plates can be situated in the free spaces existing between the retention means, the plates being linked in a swivelling fashion, and at their lower ends to the corresponding arms of two parallel cranks which move in synchronism with each other; and the plates having, at their upper region, a sequence of V-shaped concavities for providing consecutive support of the product to be transported from the retention means to the vertical transport means, the two end plates of each group being smooth in order to prevent the product being transported from falling from the side of these means.

4. Improvements in automatic weighing machines for fruits and the like, in accordance with claim 3, characterized in that the weighing means includes of a series of vertical plates, which are parallel to each other, which constitute sets facing the corresponding feed channels and are located on top of transducers of the load cell type, the said plates having V-shaped concavities at their upper region with the exception of the end plates of each group, which are smooth in order to prevent lateral overflow of the product being weighed, the arrangement being such that the free spaces between each pair of said plates is in alignment with the corresponding plates of the horizontal transport means, in order to allow intercalation and mutual passage of these during the motion of the horizontal transport means; the plates of the weighing means being provided with shock absorbing components at their upper edges, thus facilitating the weighing operation.

5. Improvements in automatic weighing machines for fruits and the like in accordance with claim 3, characterised in that horizontally between the weighing means and the vertical transport means there is provided fixed means for allowing temporary resting of the product, these being made up by a series of vertical plates which are parallel and arranged in sets which are aligned with the corresponding feed channels, the above said plates being provided with V-shaped concavities at their upper region, with the exception of the two end plates of each set, which are smooth in order to prevent the product being supported from overflowing in the transverse sense, the arrangement being such that the plates of the horizontal transport means are able to pass between each pair of the above-said plates, to allow the movement of said transport means.

6. Improvements in automatic weighing machines for fruits and the like, in accordance with claim 3, characterized in that the vertical transport means are made up by two lateral endless chains mounted on corresponding guiding, driving and operating components, between which a certain number of transverse tiltable tubular supports are provided, these having rods joined to them which lie in planes which are perpendicular to the said supports and which constitutes V-shaped grids arranged in a number of sets corresponding to the number of channels and in alignment with the latter, each group, at its end having rods which are bent towards the inside of the V in order to prevent the product being transported from falling off at the edge, this being done in such a way that the free spaces between each pair of rods is able to fit between the corresponding plates of the horizontal transport means, so that the product which has already been weighed can be deposited on the corresponding grid; and the forward portion of the vertical transport means is operated in the ascending sense, so that the product is raised to reach a position at which, following operation of pivoted parts on the guide paths on which corresponding wheels of arms joined to the ends of the transverse tubular supports, slide a backwards deflection of the corresponding pair of arms is produced, and as a result of this, a rotation of its support is obtained thus bringing about a downwardly directed turning movement of the grid or grids, thus causing the product to slide on to the corresponding ramp, which then leads the product to the respective storage area; and in that if the product is qualified as a reject, by the processing unit, it will not be discharged on to the ramps linked to the operative storage areas and will be raised to a position above these, where it will be discharged on to the reject ramp, so that it will be unloaded and directed towards the entry to the machine since, at this final upper end of the ascending paths, fixed deflecting means are provided which cause all the grids to automatically be tilted downwardly after which the chains together with their transverse supports and empty grids will continue by descending vertically, at the rear of the machine, in order to return to their starting position, where, without interruption and continuously, they recommence their active ascending travel.

7. Improvements in automatic weighing machines for fruits and the like in accordance with claim 1, characterised in that the storage areas are made up in such a way that each pair of them is bordered by a common immediate wall which is fixed and by two symmetrical movable parts, each one of which constitutes the other transverse wall and the base respectively, each storage area being closed by means of two lateral walls which are displaceable outwardly to facilitate discharge of the product having the desired final weight; the discharge operation being brought about by rotation of the movable part of the storage area.

8. Improvements in an apparatus for handling and weighing of products such as fruits and the like, comprising:

feed entry means for the products to be weighed, said feed entry means including a horizontally elongated guide channel which slopes downwardly at a small angle from the entry end to the discharge end thereof;

retaining means fixedly positioned adjacent the discharge end of said guide channel for temporarily and stationarily retaining the product to be weighed, said retaining means including structure which defines a generally upwardly opening V-shaped notch for supporting the product, said structure extending across the complete width of the discharge end of the guide channel, said structure being formed by a set of parallel vertical members which are disposed in aligned but spaced relationship so as to define vertical slots therebetween which extend in a selected transporting direction which is substantially parallel with the elongated direction of the guide channel;

weighing means positioned adjacent but spaced horizontally from said retaining means for weighing the transported products, said weighing means including a set of parallel vertical weighing plates which are disposed in aligned but spaced relationship so as to define vertical slots therebetween which are horizontally aligned with the slots between the retaining members, the set of weighing plates defining an upwardly opening V-shaped notch or cavity at the upper end thereof for supporting therein the product;

vertical transport means spaced horizontally from said weighing means and disposed on the opposite side thereof from said guide channel, said vertical transport means including elevator means having a plurality of vertically spaced product support means mounted thereon for lifting the product upwardly, said product support means being of a gridlike structure formed by a set of rods which project dominantly in a horizontal direction as they are being lifted upwardly for supporting said product thereon, said rods being aligned in horizontally spaced relationship so as to define slots therebetween which are aligned with the slots between the vertical weighing plates; and horizontal transport means for sequentially moving the product in a steplike manner from the retaining means to the weighing means and then to the vertical transport means, said horizontal transport means including a series of parallel transporting plates disposed in horizontally aligned but spaced relationship so as to define vertical spaces therebetween which accommodate therein the retaining members, the vertical weighing plates and the support rods, said transporting plates being accommodated in the aligned slots defined by the retaining means, the weighing means and the vertical transport means, said transporting plates being horizontally elongated so as to extend from a location adjacent said retaining means through said weighing means to a location adjacent said vertical transport means;

said set of transport plates defining in the upper portion thereof a first upwardly opening V-shaped seat for supporting the product therein to effect transfer of the product from the retaining means to the weighing means, said set of transport plates in the upper portion thereof having at least one further upwardly opening V-shaped seat therein for supporting the product to effect horizontal transfer thereof from the weighing means to the vertical transport means;

said horizontal transport means also including drive means connected to said set of transporting plates for effecting movement thereof along a closed looplike vertical path to effect horizontal steplike movement of the product from the retaining means to the weighing means and then to the vertical transport means.

9. An apparatus according to claim 8, including at least one stationary support means disposed horizontally between said weighing means and said vertical transport means, said stationary support means being defined by a plurality of parallel vertical plates disposed in aligned but spaced relationships so as to define slots therebetween aligned with the slots of the weighing means, the vertical plates of the support means defining an upwardly opening V-shaped seat for intermediate stationary support of the product; and the horizontal transport means including at least one additional V-shaped seat formed therein and disposed horizontally between said first seat and said further seat.

10. An apparatus according to claim 8, including conveyor means positioned over said weighing means for receiving product thereon and for transporting said product away from said apparatus, a plurality of openable product-receiving compartments positioned above said conveyor means for receiving therein a predetermined quantity of product and for then depositing said product on the conveyor means, and a plurality of ramps extending from said vertical transport means to the individual compartments for transferring product thereto.

11. An apparatus according to claim 8, wherein said feed entry means defines a plurality of separate said guide channels disposed in adjacent side-by-side relationship, said plurality of guide channels permitting the conveyance therethrough of products in separate groups.

* * * * *

UNITED STATES PATENT AND TRADEMARK OFFICE

CERTIFICATE OF CORRECTION

PATENT NO. : 4 405 023

DATED : September 20, 1983

INVENTOR(S) : Agustin D. Guardiola

It is certified that error appears in the above-identified patent and that said Letters Patent is hereby corrected as shown below:

Col. 11, line 9; change "retention" to ---retaining---.

Col. 11, line 23; change "transport" to ---transporting---.

Col. 11, line 46; change "retention" to ---retaining---.

Col. 11, line 52; change "retention" to ---retaining---.

Signed and Sealed this

*Twentieth* Day of *March 1984*

[SEAL]

*Attest:*

GERALD J. MOSSINGHOFF

*Attesting Officer* *Commissioner of Patents and Trademarks*